United States Patent
Andrejco et al.

(10) Patent No.: US 9,574,950 B2
(45) Date of Patent: Feb. 21, 2017

(54) GRATING-BASED SENSOR

(71) Applicant: OFS Fitel, LLC, Norcross, GA (US)

(72) Inventors: Matthew J Andrejco, Clinton, NJ (US); David J Kudelko, Rockaway, NJ (US); Yaowen Li, Princeton, NJ (US); Man F Yan, Berkeley Heights, NJ (US)

(73) Assignee: OFS FITEL, LLC, Norcross, GA (US)

( * ) Notice: Subject to any disclaimer, the term of this patent is extended or adjusted under 35 U.S.C. 154(b) by 162 days.

(21) Appl. No.: 14/381,638

(22) PCT Filed: Mar. 7, 2013

(86) PCT No.: PCT/US2013/029733
§ 371 (c)(1),
(2) Date: Aug. 28, 2014

(87) PCT Pub. No.: WO2013/134575
PCT Pub. Date: Sep. 12, 2013

(65) Prior Publication Data
US 2015/0338286 A1    Nov. 26, 2015

Related U.S. Application Data

(60) Provisional application No. 61/607,874, filed on Mar. 7, 2012.

(51) Int. Cl.
*G01N 21/00* (2006.01)
*G01K 11/32* (2006.01)
(Continued)

(52) U.S. Cl.
CPC ........... *G01K 11/3206* (2013.01); *G01L 1/246* (2013.01); *G02B 6/021* (2013.01); *G02B 6/02042* (2013.01);
(Continued)

(58) Field of Classification Search
CPC . G01K 11/3206; G01L 1/246; G02B 6/02042; G02B 6/02061; G02B 6/3846; G02B 6/021; G02B 6/02123; G01N 21/00
(Continued)

(56) References Cited

U.S. PATENT DOCUMENTS 5,550,940 A    8/1996 Vengsarkar et al.
6,865,194 B1   3/2005 Wright et al.
(Continued)

OTHER PUBLICATIONS

Melle, S.; Alavie, A.; Karr, S.; Coroy, T.; Liu, K.; and Measures, R., "A Bragg Grating-Tuned Fiber Laser Strain Sensor System," IEEE Photonics Technology Letters, vol. 5, No. 2, pp. 263-266 (Feb. 1993).

*Primary Examiner* — Abdullahi Nur
(74) *Attorney, Agent, or Firm* — Jacobs & Kim LLP

(57) ABSTRACT

An optical fiber-based sensor is described that is suitable for operation in a gas-rich environment. The sensor comprises a chamber into which are mounted one or more segments of optical fiber, into which are inscribed a plurality of sensor gratings. Each of the plurality of sensor gratings is configured to have the same wavelength shift over time in response to a change in gas diffusion, such that gas diffusion parameters are excluded in the determination of the respective amount of change in temperature, applied strain, and gas diffusion. Also described is a fiber, and techniques for making same, comprising of cores extend through a common cladding. The cores are doped so as to create, in conjunction with the cladding, a plurality of waveguides having the same wavelength shift over time is response to a change in gas diffusion, but different wavelength shifts in response to changes in other parameters.

32 Claims, 6 Drawing Sheets

(51) Int. Cl.
  *G01L 1/24* (2006.01)
  *G02B 6/02* (2006.01)
  *G02B 6/38* (2006.01)
  *G02B 6/28* (2006.01)

(52) U.S. Cl.
  CPC ....... *G02B 6/02061* (2013.01); *G02B 6/02123* (2013.01); *G02B 6/2835* (2013.01); *G02B 6/3846* (2013.01); *G02B 6/02076* (2013.01); *G02B 2006/2839* (2013.01)

(58) Field of Classification Search
  USPC .................................................. 356/72–73
  See application file for complete search history.

(56) References Cited

U.S. PATENT DOCUMENTS

| | | | |
|---|---|---|---|
| 7,512,292 B2 * | 3/2009 | MacDougall | G01K 11/3206 385/12 |
| 8,123,400 B2 | 2/2012 | Andrejco et al. | |
| 2010/0135608 A1 | 6/2010 | Chen | |

* cited by examiner

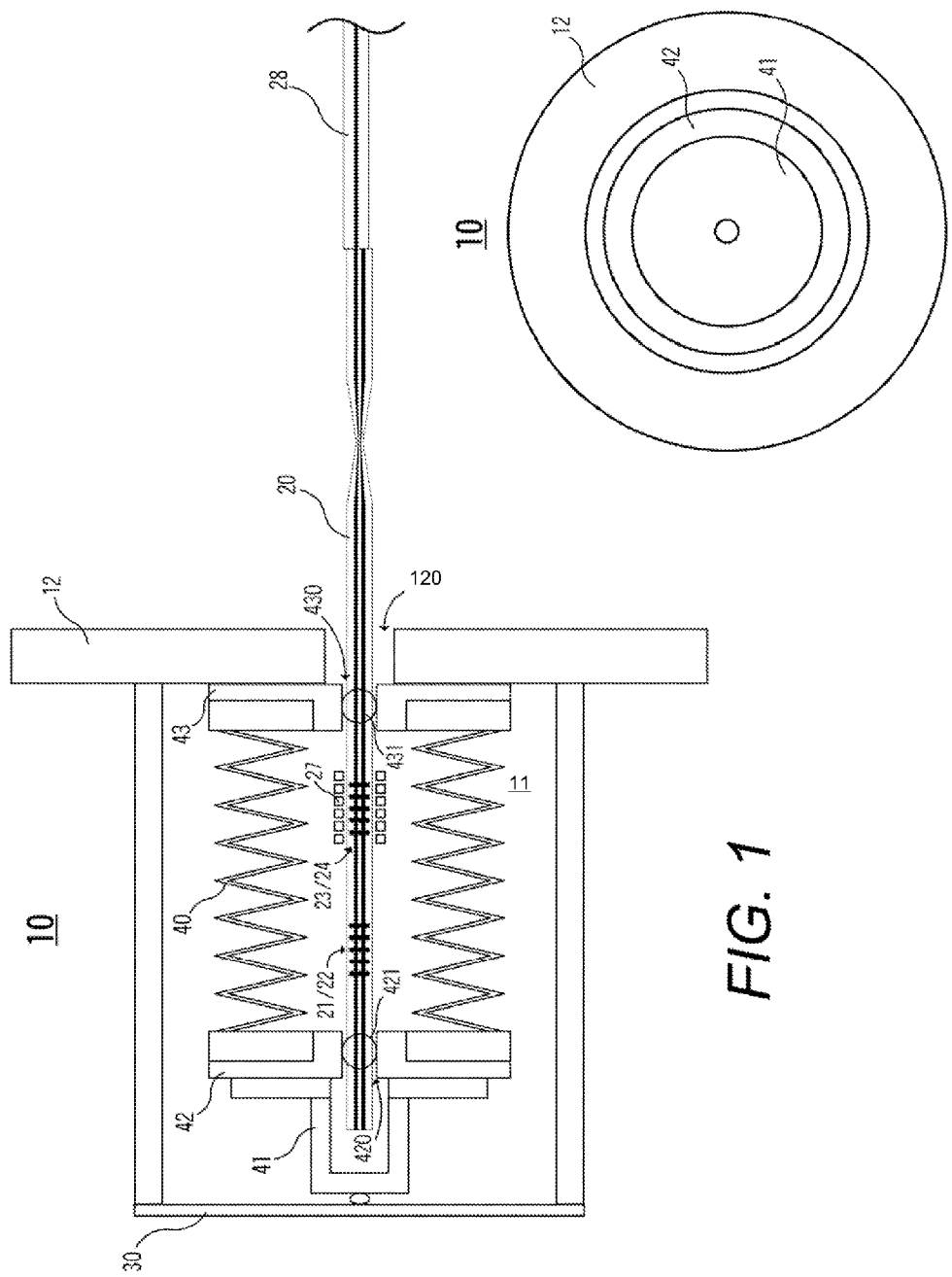

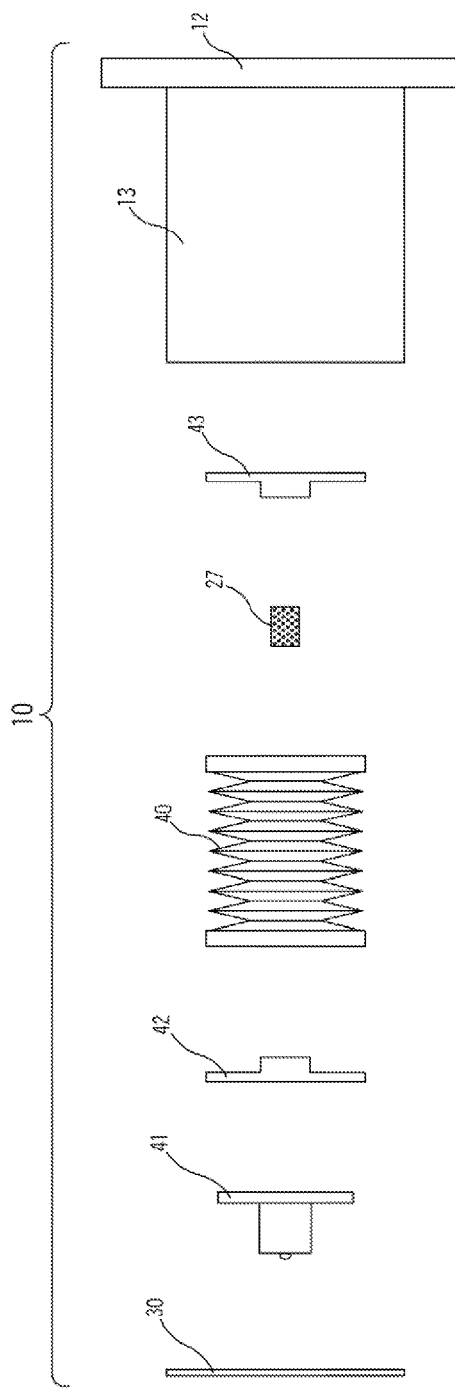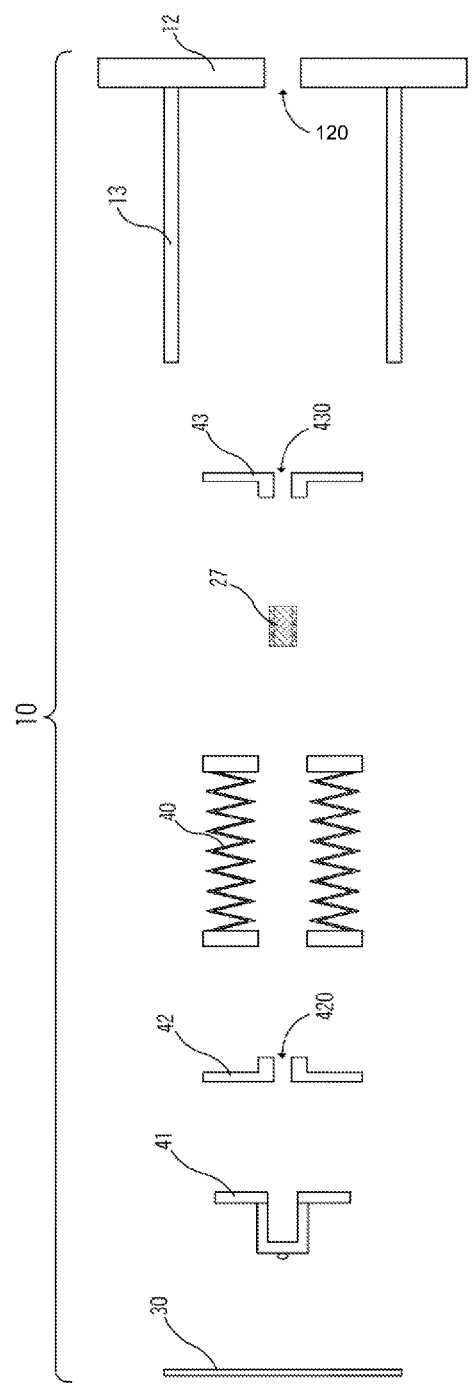

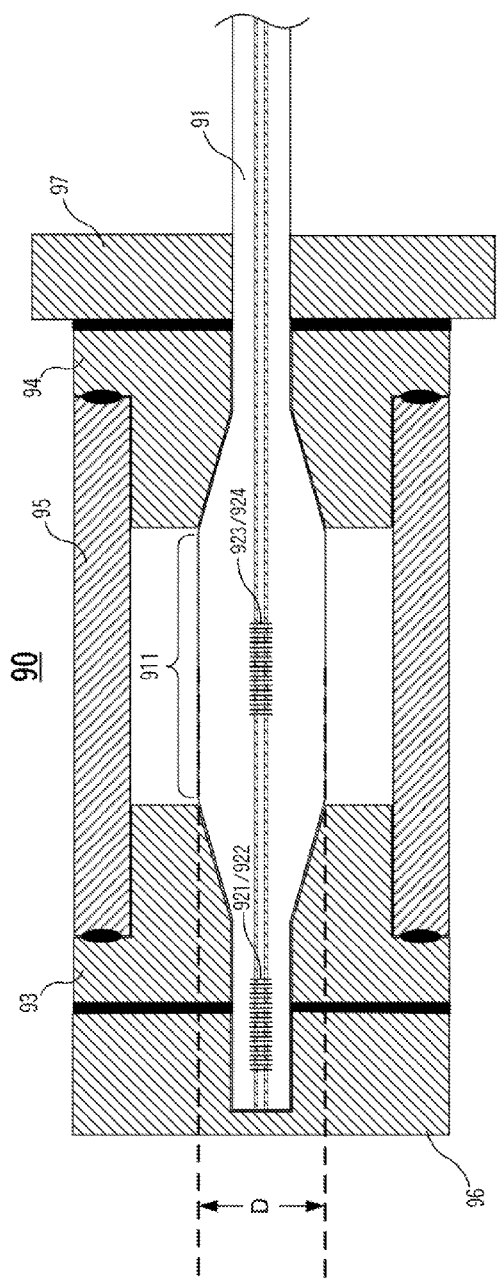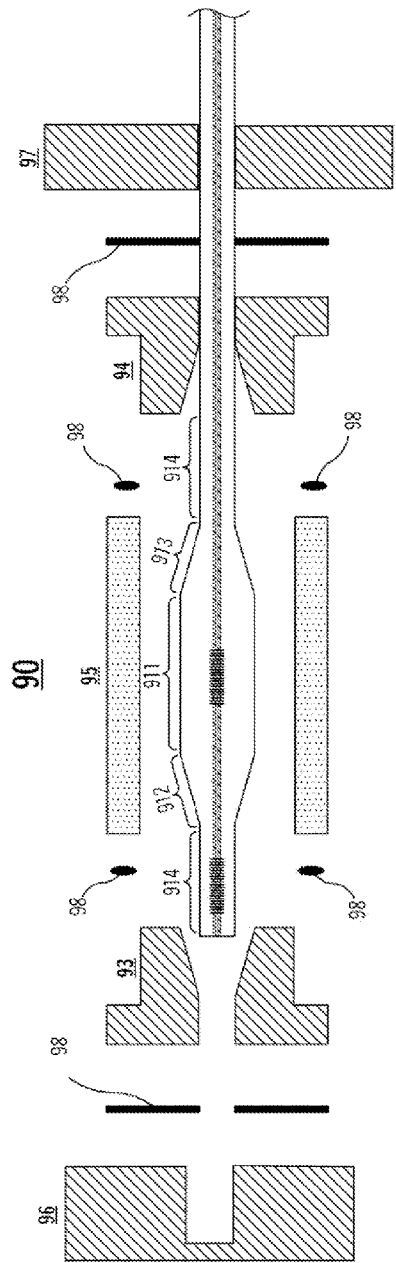

GRATING-BASED SENSOR

CROSS REFERENCE TO RELATED APPLICATION

The present application claims the priority benefit of U.S. Provisional Patent Application Ser. No. 61/607,874, filed on Mar. 7, 2012, which is owned by the assignee of the present application, and which is incorporated herein by reference in its entirety.

BACKGROUND OF THE INVENTION

Field of the Invention

The present invention relates generally to the field of fiber optics, and in particular to an improved grating-based fiber optic sensor.

Background Art

Grating-based fiber optic sensors are used in a number of different applications to measure temperature, strain, pressure, vibration, fluid level, and the like. Fiber-based sensing technology has a number of advantages over electric sensors, including, for example: small size, high sensitivity, and remote operation. In addition, fiber optic sensors do not send electrical power to the sensor location and do not conduct electricity; they are thus immune to electromagnetic interference. In grating-based fiber optic sensors, the sensing function is provided by fiber Bragg gratings (FBGs), which have a wavelength response that is sensitive to a number of parameters applied to the sensor, including temperature and strain.

Typically, in an environment that is rich in certain gases, such as hydrogen or deuterium, the diffusion of these gases through a fiber optic sensor not only causes the fiber components to experience insertion losses, but also changes the fiber properties, such as the effective refractive index. These unwanted insertion losses and index changes typically lead to measurement accuracy problems, respectively, for intensity-based and wavelength-based fiber optic sensors.

To combat this gas diffusion problem, a number of possible solutions have been explored, including: designing fibers to be less susceptible to particular gases; designing sensor packages to block the gases from entering the sensor body; and providing an additional sensor for gas monitoring. However, these technologies typically have only been able to either improve the sensor performance by a relatively small amount or have thus far not been cost-effective.

SUMMARY OF THE INVENTION

An aspect of the invention is directed to an optical fiber-based sensor for operating in an environment rich in a selected gas.

A sensor array, comprising a plurality of individual gratings, is written into a lead end of a twin-core optical fiber. The portion of the optical fiber containing the sensor array is placed into a sealed enclosure. The sensor array is configured such that a light input into the optical fiber results in respective individual outputs from each sensor grating that vary in response to respective changes in temperature, gas diffusion, and strain. These outputs are used to derive exact values for changes in these physical quantities. One of ordinary skill will understand that the applied strain(s) on the gratings also can be related to other physical parameters to be measured, such as ambient pressure.

According to an aspect of the invention, the plurality of sensor gratings is configured to have equal wavelength shifts in response to gas diffusion within the optical fiber, such that gas diffusion parameters can be excluded when deriving changes in temperature, strain, and gas diffusion. Thus, a sensor array according to the invention is capable of providing accurate measurements at varying levels of gas diffusion.

A further aspect of the invention is directed to a twin-core optical fiber for use with the inventive sensor array, and techniques for making same, wherein first and second cores extend through a common cladding, and wherein the first and second cores are doped so as to create, in conjunction with the cladding, a plurality of waveguides having different wavelengths for the gratings inscribed in them, but having the same wavelength shift for the gratings over time in response to the same change in gas diffusion.

BRIEF DESCRIPTION OF THE DRAWINGS

FIG. 1 shows a cross-section diagram, not drawn to scale, of an exemplary FBG-based pressure and temperature sensor for gas-rich environment according to an aspect of the invention.

FIG. 2 shows a plan view of the sensor shown in FIG. 1, with the fiber gratings and diaphragm removed for purposes of illustration.

FIGS. 7 and 8 show, respectively, an exploded side view and an exploded cross section view of the sensor shown in FIG. 1, minus the fiber gratings.

FIGS. 9A and 9B show, respectively, cross section and exploded cross section views of a pressure and temperature sensor configuration for a gas-rich environment, according to a further aspect of the invention.

DETAILED DESCRIPTION

Figures 3A, 3B:
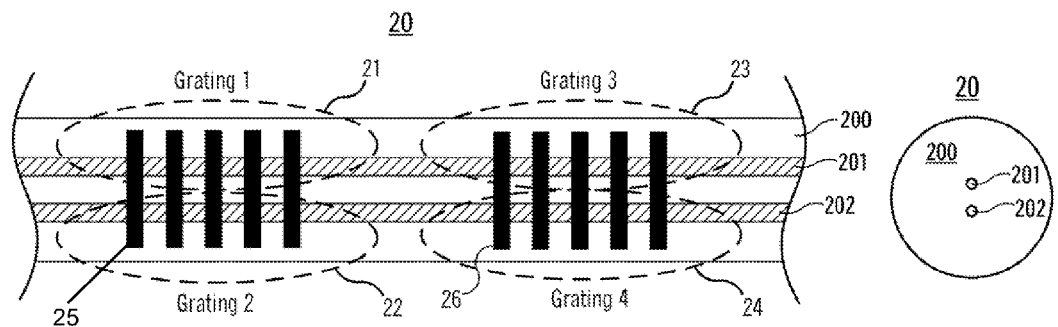
FIGS. 3A and 3B show, respectively, cross section and end views, not drawn to scale, of the sensor array used in the FIG. 1 sensor.

Aspects of the present invention are directed to grating-based sensors for use in gas-rich environments. Further aspects of the invention are directed to techniques for designing twin-core fibers for use in such sensors.

The sensors described herein employ arrays of individual gratings, each of which has a respective Bragg wavelength that shifts in response to changes in any of a selected plurality of physical quantities, such as strain and temperature. The grating wavelengths also shift in response to changes in diffusion of certain gases within the grating. Sensor data is generated by launching an input light into a sensor array and monitoring the back-reflected light for respective wavelength shifts at each sensor grating. The generated wavelength shift data can then be used to derive the respective amount of change for each of the selected physical quantities.

As discussed above, when operating in a gas-rich environment, the accuracy of prior grating-based sensor designs has typically suffered as a result of gas diffusion in the sensor gratings. The present invention addresses this issue by configuring the sensor gratings such that each sensor grating displays the same wavelength shift in response to same change in gas diffusion, thereby greatly simplifying the temperature and strain/pressure measurement calculation.

By configuring the gratings in this way, gas diffusion parameters can be excluded when calculating the respective amount of change in each selected physical quantity. Compared with prior fiber-based sensors, a sensor according to the present invention will typically display a significantly increased reliability and robustness of measurement accuracy in a gas rich environment.

It is noted that aspects of the invention are described herein in the context of measuring strain/pressure and temperature. However, it will be appreciated that the operational principles of the present invention can be applied to measure other physical quantities in a gas-rich environment, through the use of other configurations that translate those other physical quantities into a strain applied to the sensor gratings.

As used herein, the terms "grating" and "sensor grating" refers generically to any grating, such as a fiber Bragg grating (FBG) or the like, having a wavelength that shifts in response to changes in temperature, strain, gas diffusion, or like physical quantity, and that is suitable for use in a sensor unit.

As used herein, the term "selected gas" refers to a designated gas or mixture of gases, such as hydrogen or deuterium that, if present in a sufficiently high concentration in the ambient atmosphere, causes over time a wavelength shift in a sensor grating.

The term "gas diffusion" refers to the amount of diffusion of a selected gas within a sensor grating.

The term "gas-rich environment" refers to an operating environment for a grating-based sensor, in which a selected gas is present at a concentration that is sufficiently high to cause, over time, a loss in sensing accuracy resulting from gas diffusion within the sensor gratings.

When two or more quantities or structures are described herein as "matching" or as being "identical" or "the same," it is meant that the two or more quantities are equal to each other within a selected tolerance, so as to achieve a desired result over a given operating range.

The present discussion is organized into the following sections:

1. Theoretical Foundation
2. Exemplary FBG-Based Pressure and Temperature Sensor 1
2.1 Optical Fiber Segment with Inscribed Gratings
2.2 Diaphragm Component
2.3 Mechanical Interface
2.4 Application of Linear System 1 to Exemplary Sensor 1
3. Exemplary FBG-Based Pressure and Temperature Sensor 2
3.1 Application of Linear System 1 to Exemplary Sensor 2
4. Exemplary FBG-Based Strain and Temperature Sensor
5. Fiber Design 1. Theoretical Foundation As discussed above, a sensor according to the present invention comprises a plurality of sensor gratings having respective wavelengths that shift in response to changes in certain physical quantities, such as ambient temperature, applied strain (which could represent a transformation of ambient pressure), and gaseous diffusion. An input light is launched into the plurality of sensor gratings, resulting in an output light, i.e., the light reflected back from the plurality of gratings, containing wavelength data for each of the plurality of sensor gratings. In particular, the sensor output can be used to obtain wavelength shift data for each of the sensor gratings.

For the purposes of the present discussion, it is assumed that there are three physical quantities that are being measured at each sensor grating:

(1) ambient temperature, T;
(2) surrounding pressure, which is translated to strain, $\epsilon$, applied to the grating; and
(3) gas diffusion G.

It is further assumed that there is a linear relationship between changes in each of the physical quantities and wavelength shifts displayed by each sensor grating.

From a mathematics point of view, it will be seen that wavelength shift data must be obtained from at least three sensor gratings in order to arrive at a single, unique solution for the amount of change in one or more of the selected physical quantities. Further, each grating must be differentiated in some way from the other two gratings, in order to provide unique and accurate solutions.

In an arrangement comprising four gratings (Gratings 1, 2, 3 and 4), when the three physical quantities exist, a linear system with four equations can be generated from the wavelength measurements of those four gratings.

Linear System 1

$$\Delta\lambda_1 = K_{T1}\Delta T_1 + K_{\epsilon 1}\Delta\epsilon_1 + K_{g1}\Delta g_1 \quad \text{(Eq. 1.1)}$$

$$\Delta\lambda_2 = K_{T2}\Delta T_2 + K_{\epsilon 2}\Delta\epsilon_2 + K_{g2}\Delta g_2 \quad \text{(Eq. 1.2)}$$

$$\Delta\lambda_3 = K_{T3}\Delta T_3 + K_{\epsilon 3}\Delta\epsilon_3 + K_{g3}\Delta g_3 \quad \text{(Eq. 1.2)}$$

$$\Delta\lambda_4 = K_{T2}\Delta T_4 + K_{\epsilon 4}\Delta\epsilon_4 + K_{g4}\Delta g_4 \quad \text{(Eq. 1.3)}$$

In Linear System 1:

$\Delta\lambda_1$, $\Delta\lambda_2$, $\Delta\lambda_3$ and $\Delta\lambda_4$ represent the generated data, i.e., the wavelength shifts that are measured, respectively, for each of Gratings 1-4;

$\Delta T_{1,2,3,4}$, $\Delta\epsilon_{1,2,3,4}$, and $\Delta g_{1,2,3,4}$ are the unknowns to be solved, i.e, the respective amount of change in temperature, strain, and gaseous diffusion for each of Gratings 1-4; and $K_{T1,2,3,4}$, $K_{\epsilon 1,2,3,4}$, and $K_{g1,2,3,4}$ are constants, and represent the respective temperature, strain, and gas diffusion coefficients for each of Gratings 1-4. These coefficients are obtained through calibration processes.

It will be seen that Linear System 1 will yield a single, unique and accurate solution only if it can be reduced into 4 equations in 4 unknowns with the coefficient matrix well-conditioned. This, as we see later, can be achieved by design different sensor configurations. If more unknowns exist, more independent equations are needed, possibly from more grating sensors.

The next sections provide description of exemplary FBG-based pressure and temperature sensors according to an aspect of the invention, as well as the application of Linear System 1 to the exemplary sensors.

2. Exemplary FBG-Based Pressure and Temperature Sensor 1

FIG. 1 shows a cross-section diagram, not drawn to scale, of an exemplary FBG-based sensor 10 according to an aspect of the invention that is used to measure temperature and pressure. FIG. 2 shows a plan view of the sensor 10, with fiber segment 20 and diaphragm 30 removed.

Sensor 10 comprises three major components: (A) an optical fiber segment 20 into which is inscribed a plurality of gratings 21-24; (B) a diaphragm 30 that deforms due to the surrounding pressure; and (C) a bellows-type structure 40 that translates the deformation of diaphragm 30 into a change in the strain applied to gratings 21-24. Optical fiber segment 20 and related components are additionally illustrated in FIGS. 3 and 4. Diaphragm 30, bellows 40, and related structural components are additionally illustrated in the exploded views shown FIGS. 7 and 8. Each of the major components is described in detail below.

Gratings 21-24 provide wavelength shift data in response to changes in temperature, strain/pressure, and gas diffusion. Diaphragm 30 is fabricated from a resilient material and is configured to have a deflection state that changes in response to changes in surrounding pressure. The fiber and thus, the gratings, are pre-strained during the assembly and bellows 40 is configured to change the strain(s) across the sensor gratings 21-24 when the deflection state of diaphragm 30 changes due to a pressure change. The materials and dimensions for all the parts are chosen so that the temperature change will not affect the strain change in the fiber. Thus, when the sensor is calibrated with temperature and pressure, the wavelength changes from the gratings can give the temperature and pressure data.

Each component is described in turn, followed by a discussion with respect to the application of Linear System 1 to exemplary sensor 10.

2.1 Optical Fiber Segment with Inscribed Gratings

Figures 4A, 4B:
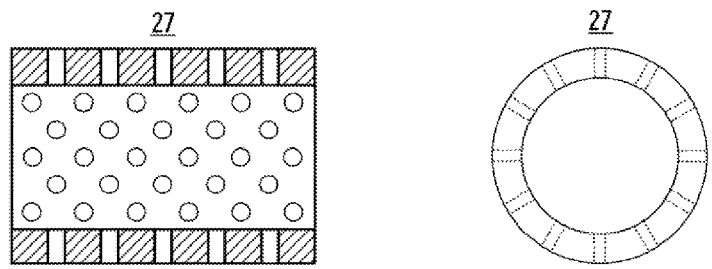
FIGS. 4A and 4B show, respectively, cross section and end views, not drawn to scale, of the porous glass tube used to increase the strain resistance of Gratings 3 and 4 in the sensor array used in the FIG. 1 sensor.

FIGS. 3A and 3B show, respectively, cross section and end views, not drawn to scale, of the twin-core optical fiber segment 20 used in sensor 10, including gratings 21-24. FIGS. 4A and 4B show, respectively, cross section and end views of a porous glass tube 27 having an inner diameter that is slightly larger than the outer diameter of fiber segment 20. The ends of the porous glass tube are fused, or bonded by other similar means, to fiber segment 20 around grating pair 23/24 so that the stiffness of the fiber in that section will be different from the stiffness of the fiber in the fiber region including grating pair 21/22. This arrangement will create different strains in the two grating regions. The reason the tube is porous is so that the gas diffusion effect on the two grating regions will be the same, thereby reducing the number of unknowns in Linear System 1.

As shown in FIGS. 3A and 3B, fiber segment 20 comprises a cladding 200, through which extends a first fiber core 201 and a second fiber core 202 that are configured to exhibit little or no mode coupling (i.e., crosstalk), absent tapering of the fiber segment. An example of a twin-core fiber design is described in U.S. Pat. No. 8,123,400, which is owned by the assignee of the present application, and which is incorporated herein by reference in its entirety.

The design described in U.S. Pat. No. 8,123,400 primarily provides a sensor for temperature measurement in a gas-rich environment. The present invention, on the other hand, provides devices for measuring additional physical parameters, especially pressure. Also, the first and second fiber cores 201 and 202 can be configured to have the exactly same wavelength shift in response to changes in gas diffusion, but to still have significantly different wavelength shifts in response to changes in temperature. A technique according to a further aspect of the invention is described below for configuring cores 201 and 202 in this way.

The use of a twin-core fiber allows for the fabrication of a plurality of identical, closely-spaced grating pairs, thereby allowing the precise matching of certain selected grating parameters. As shown in FIG. 3A, inscribed into fiber segment 20 are a plurality of gratings 21-24 suitable for use in accordance with the techniques described herein.

Gratings 21-24 are created by inscribing a periodic set of perturbations 25, 26 into fiber segment 20. Because the perturbations span both fiber cores 201 and 202, each set of perturbations 25, 26 creates a respective pair of adjoining gratings 21/22, 23/24 having the same grating period. The two cores are created to have different effective indices and the grating periods in perturbations 25 and 26 are made different. With these arrangements, the wavelengths of these four gratings are different initially and never overlap during the sensor operation which ensures easy measurements and measurement accuracy. As mentioned above, the two cores 201 and 202 are configured such that within each grating pair, the two gratings can have the same wavelength shift in response to changes in gas diffusion, but have significantly different shifts in response to changes in temperature. With these characteristics and the sensor arrangement in FIG. 1, it is demonstrated below that using the twin-core gratings in the first group (designated as Gratings 1 and 2 respectively in the figures) and one grating in the second group (designated as Grating 3 in the figures) can mathematically demonstrate how it is possible to exclude the gas diffusion in the temperature and pressure calculation.

Figure 5:
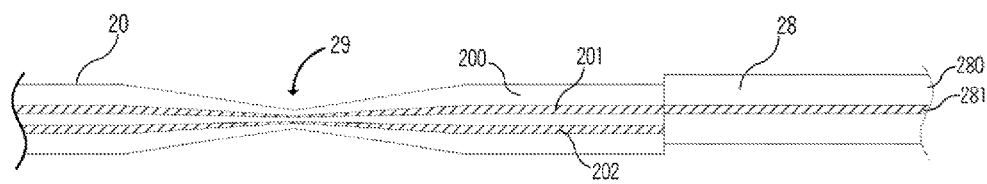
FIG. 5 is a cross section view of a twin-core fiber and a single-core fiber that have been spliced together, illustrating how an offset-spliced single-core fiber launches light through a coupling region in the twin-core fiber into both cores of the twin-core fiber, while also collecting the light reflected back from each of the two cores resulting from the presence of respective gratings in each core.
Figure 6:
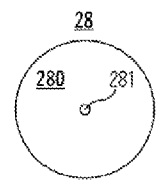
FIG. 6 shows an end view of the single-core fiber shown in FIG. 5.

FIG. 5 shows a cross section diagram of the tail end of fiber segment 20. Connected to the tail end of fiber segment 20 is the lead end of a single-core fiber (SCF) 28, which is used to launch an input light into sensor 20, and to also transmit the sensor output (i.e., the light reflected by gratings 21-23) to a centrally located optical data processing system. FIG. 6 shows an end view of SCF 28, which comprises a cladding 280 through which a single core 281 extends.

SCF 28 is connected to twin-core fiber segment 20, such that the SCF core 281 is aligned with one of the two twin-core fiber cores. (In FIG. 6, SCF core 281 is depicted arbitrarily as being connected to core 201 of fiber segment 20.) Because of the off-center position of each of the two cores of fiber segment 20, the described connection will result in a slight offset between the end faces of fiber segment 20 and SCF 28 at the splice point.

Twin-core fiber segment 20 includes a tapered portion 29, which is configured to provide optical coupling between the two twin-core fiber cores 201 and 202. Thus, the light provided as an input by SCF 28 is distributed across both twin-core fiber cores. Similarly, light signals reflected back by gratings 21 and 23 along core 201, and reflected back by gratings 22 and 24 along core 202, are coupled into the SCF core 281.

2.2 Diaphragm Component

The sensor diaphragm 30 and supporting structures are now described in greater detail.

FIGS. 7 and 8 show, respectively, exploded side and cross section views of the sensor components, minus the fiber segment 20. Diaphragm 30 comprises a sheet of a suitable material, such as plastic, metal alloy, stainless steel, or ceramic, that is attached to seal a chamber 11 formed by a base plate 12 and an outer wall 13. The connecting areas from the base plate and the outer wall are also sealed. The chamber 11 and diaphragm 30 are configured such that the effect of a change in surrounding pressure on the grating and bellows assembly is mostly from a change in the displacement of the diaphragm 30. System 10 requires a relatively small amount of total displacement of diaphragm 30, on the order of 0.1 mm or less.

2.3 Mechanical Interface

The bellows 40 is now described in greater detail. As mentioned above, the function of the bellows is to provide a mechanical interface that translates a change in the displacement of diaphragm 30 into a change in the amount of strain applied across gratings 21-24.

Bellows 40 is contained entirely within chamber 11. Bellows 40 has a tail end that is mounted to the upper surface of base plate 12 (as can be seen in FIG. 1), and a lead end that extends along the longitudinal axis of chamber 11 towards diaphragm 30. Bellows 40 is resiliently expandable when pre-pressing force is reduced and contractible when pressed more along this longitudinal axis.

As shown in FIGS. 1, 7 and 8, system 10 further includes a mechanical coupler 41 that connects the bellows lead end to the inner surface of diaphragm 30. The diaphragm 30, bellows 40, and coupler 41 are configured such that a change in the displacement of the diaphragm 30, i.e., in response to a change in surrounding pressure, is translated into a corresponding bellows displacement and thus the strain change along the fiber.

Looking again to FIG. 1, fiber segment 20 is mounted into bellows 40 such that the portion of the fiber segment 20 containing gratings 21-24 extends between the bellows lead and tail ends, with the tail end of fiber segment 20 extending outside of the sensor body through a hole 120 in base plate 12. In the depicted practice of the invention, this is accomplished by providing bellows 40 with a lead end fitting 42 and a tail end fitting 43, having respective holes there through 420 and 430 that are shaped to closely receive the fiber segment 20. In the fully assembled sensor, holes 420 and 420 are positioned over the base plate hole 120.

In practice, the end fittings 42 and 43 are attached to the bellows 40 first through welding or other bonding methods. The fiber segment 20 with gratings and the porous tube 27 bonded to it is then threaded into the bellow 40. The bellows 40 is then compressed to a designated value and the fiber segment 20 is then bonded at Points 421 and 431, shown in FIG. 1. Releasing the bellows 40 will create a tension in the fiber, and thus the gratings are pre-tensioned. The bonding can be achieved by different methods, such as glass solder, epoxy and glues, and brazing and soldering if the fiber segment in those two areas is metal-coated. The mechanical coupler 41 can then be attached to the bellows 40, and the assembly thus far can be attached to the base plate 12. After these are done, the chamber 11 is attached to the base plate 12 and the diaphragm 30 is attached to the chamber 11. The attachments between the chamber 11 and base plate 12 and between the diaphragm 30 and the chamber 11 are made such that they are sealed to avoid the pressure to leak into the chamber 11.

Thus, in operation, a change in the surrounding pressure causes a change in the displacement of diaphragm 30. Mechanical coupler 41 translates changes in displacement of the diaphragm 30 into a corresponding change in the displacement of bellows 40 and thus changing the tension in the fiber. It should be noted that the materials for the bellows, the mechanical coupler, the chamber and the end fittings are chosen such that the temperature change doesn't change the tension in the fiber. So, the fiber tension change is solely from the pressure change, thus making the sensor calibration and measurement easy. It should also be noted that the order of assembly steps may be varied, depending upon other manufacturing considerations.

2.4 Application of Linear System 1 to Exemplary Sensor 1

For the purposes of the present section, the three sensor gratings 21, 22, and 23 are referred to respectively as Grating 1, Grating 2, and Grating 3.

As discussed above, all three sensor gratings have the same wavelength shift in response to changes in gas diffusion. Further, Grating 1 and Grating 2 are configured to have different wavelength shifts in response to changes in temperature and strain. Grating 1 and Grating 3 are identical, and thus have the same wavelength shift in response to changes in strain and changes in temperature. But, because of the presence of porous glass tube 27, Grating 1 and Grating 3 will experience different strains.

Thus:

Gratings 1, 2, and 3 all have the same gas diffusion constant $K_g$.

Gratings 1 and 3 have the same temperature constant, $K_{T1}$ and the same strain constant $K_{\epsilon 1}$.

Grating 2 has a temperature constant $K_{T2}$ and a strain constant $K_{\epsilon 2}$ that significant differ from either the temperature constant or the strain constant or both of Gratings 1 and 3.

Gratings 1, 2, and 3 all experience the same change in temperature $\Delta T$ and change in gas diffusion $\Delta g$.

Gratings 1 and 2, since collocated, experience the same change in applied strain $\Delta \epsilon_1$. Because of the presence of the porous glass tube which increases cross section area, Grating 3 experiences a reduced change in applied strain $C\Delta \epsilon_1$ (i.e., $\Delta \epsilon_1$ scaled by a factor C). C can be obtained by calibration.

These properties of exemplary sensor 10 can be used to simplify Linear System 1, resulting in the following Linear System 2:

Linear System 2

$$\Delta \lambda_1 = K_{T1}\Delta T + K_{\epsilon 1}\Delta \epsilon_1 + K_g \Delta g \quad \text{(Eq. 2.1)}$$

$$\Delta \lambda_2 = K_{T2}\Delta T + K_{\epsilon 2}\Delta \epsilon_1 + K_g \Delta g \quad \text{(Eq. 2.2)}$$

$$\Delta \lambda_3 = K_{T1}\Delta T + K_{\epsilon 1}C\Delta \epsilon_1 + K_g \Delta g \quad \text{(Eq. 2.3)}$$

Subtracting the first equation from the second equation and the first equation from the third equation in (2) yields the further simplified Linear System 3:

Linear System 3

$$\Delta \lambda_2 - \Delta \lambda_1 = (K_{T2} - K_{T1})\Delta T (K_{\epsilon 2} - K_{\epsilon 1})\Delta \epsilon_1 \quad \text{(Eq. 3.1)}$$

$$\Delta \lambda_3 - \Delta \lambda_1 = K_{\epsilon 1}(C-1)\Delta \epsilon_1 \quad \text{(Eq. 3.2)}$$

All the coefficients, Ki, and C can be experimentally obtained during the calibration processes. Thus, it is possible to solve equations (3.1) and (3.2) to measure changes in temperature $\Delta T$ and changes in strain $\Delta \epsilon_1$, and, thus, the pressure when the temperature and strain calibrations are done. It can be found that the measurement calculations are simplified and don't include the gas diffusion. If it is desired to monitor changes in gaseous concentration in the fiber, it is possible to solve all of equations (2.1), (2.2), and (2.3) in Linear System 2 to obtain all three parameters.

3. Exemplary FBG-Based Pressure and Temperature Sensor 2

FIGS. 9A and 9B show, respectively, cross section and exploded cross section views of an exemplary pressure and temperature sensor configuration 90 for a gas-rich environment in accordance with a further practice of the invention. One attractive feature of configuration 90 is that all of its components can be fabricated from quartz or silica glass that are attached to each other using by fusion or glass solder at selected attachment areas 98 (shown in FIG. 9B). System 10 (FIG. 1), on the other hand, comprises components fabricated from various materials, such as different types of metals and glasses.

System 90 comprises a twin-core fiber 91, similar to fiber 20 shown in FIG. 1, into which are inscribed first and second grating pairs 921/922 and 923/924. As shown in FIGS. 9A and 9B, fiber 91 includes a cladding "bulge" 911 around grating pair 923/924, with tapered transitions 912, 913 between the bulge 911 and the non-bulged portions 914 of fiber 91. The bulge 911 and tapered transition regions 912, 913 are configured to fit closely within supporting end pieces 93 and 94, such that the end pieces can be used to apply a longitudinal compressive force to grating pair 923/924.

According to a practice of the invention, the cladding bulge is created by fabricating fiber 91 to have a large outer cladding diameter D (i.e., at least 500 μm) compared with the outer cladding diameter of fiber 20 in FIG. 1 (i.e., approximately 125 μm). After the gratings have been inscribed, fiber 91 can be machined to create the bulge 911 and the non-bulged portions 914 of fiber 91, and the tapered transitions 912, 913.

A cylindrical glass tube 95 is used to connect the end supporting pieces 93 and 94. The tapered fiber regions 912, 913, the end supporting pieces 93 and 94, and the cylindrical glass tube 95 are configured such that the attachment of these components together results in pre-compression of the second grating pair 923/924. An end plate 97 and a base plate 96 are then attached, respectively, to supporting pieces 93 and 94 and attachment areas 98 are sealed to create an airtight enclosure for both grating pairs. The tail end of fiber 91 is provided with a tapered coupling region that is connected to a single-core fiber (not shown) in the same way that fiber 20 is connected to single-core fiber 28 in system 10 (FIG. 1), discussed above.

The first pair of gratings 921/922 (i.e., Gratings 1 and 2), which are located towards the lead end of fiber 91, do not experience any strain. When there is an increase in the ambient pressure at the end plate 97 and at the outer surface of tube 95, there is a corresponding increase in the compressive strains in the second grating pair 923/924 (i.e., Gratings 3 and 4). Changes in temperature and gas diffusion will have corresponding respective effects on each grating pair.

3.1 Application of Linear System 1 to Exemplary Sensor 2

Similar to the case in FIG. 1, simplification of Linear System 1 can be done with the following assumptions for this sensor arrangement:

Gratings 1, 2, 3 and 4 all have the same gas diffusion constant $K_g$.

Gratings 1 and 3 have the same temperature constant, $K_{T1}$ and the same strain constant $K_{\epsilon 1}$.

Gratings 2 and 4 have same temperature constant $K_{T2}$ and strain constant $K_{\epsilon 2}$ that significant differ from either the temperature constant or the strain constant or both of Gratings 1 and 3.

Gratings 1 and 2 are strain free.

Gratings 1, 2, 3 and 4 all experience the same change in temperature $\Delta T$ due to potentially very small sensor volume Gratings 1 and 2 experience the same change in gas diffusion $\Delta g_1$ and Gratings 3 and 4 experience the same change in gas diffusion $\Delta g_2$. $\Delta g_1$ and $\Delta g_2$ may be different during different surroundings of the gratings.

Thus, Linear System 1 can be re-written as follows:

$$\Delta\lambda_1 = K_{T1}\Delta T + K_g\Delta g_1$$

$$\Delta\lambda_2 = K_{T2}\Delta T + K_g\Delta g_1$$

$$\Delta\lambda_3 = K_{T1}\Delta T + K_{\epsilon 1}\Delta\epsilon + K_g\Delta g_2$$

$$\Delta\lambda_4 = K_{T2}\Delta T + K_{\epsilon 2}\Delta\epsilon + K_g\Delta g_2$$

Subtracting the first equation from the second equation and the third equation from the fourth equation yields:

$$\Delta\lambda_2 - \Delta\lambda_1 = (K_{T2} - K_{T1})\Delta T$$

$$\Delta\lambda_4 - \Delta\lambda_3 = (K_{T2} - K_{T1})\Delta T + (K_{\epsilon 2} - K_{\epsilon 1})\Delta\epsilon$$

It can be found that the gas diffusion is excluded in the temperature and strain/pressure calculations.

Similar to the sensor in FIG. 1, the all glass materials are chosen such that the temperature change alone will not change the pre-strain in Gratings 3 and 4, thus making the calibration and measurement processes easier.

It should be noted that even if the temperature does affect the pre-strain in the gratings in both sensor configurations due to the material property variations from batch to batch, the effect may be included in the calibration processes and in the coefficients, $K_{Ti}$. The remaining calculations will be the same.

4. Exemplary FBG-Based Strain and Temperature Sensor

Figure 10:
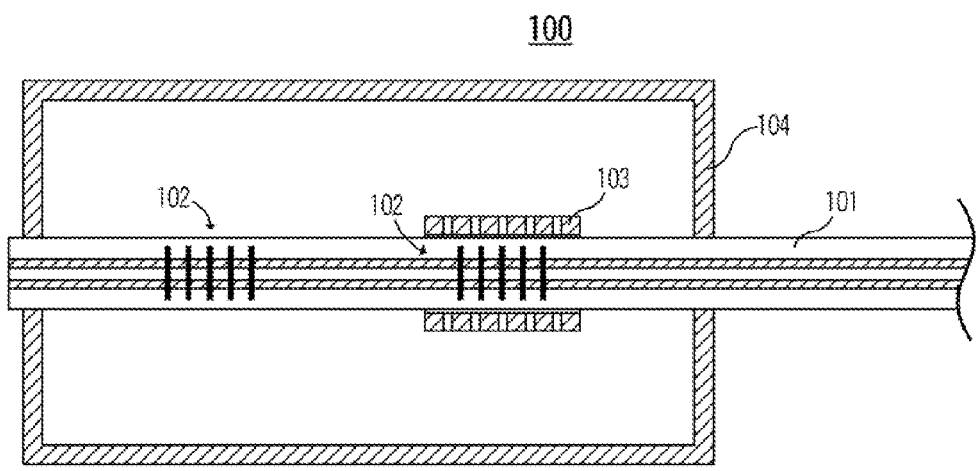
FIG. 10 shows a diagram of an exemplary temperature and strain sensor for use in a gas-rich environment according to a further aspect of the invention.

FIG. 10 shows a cross section conceptual diagram of a strain and temperature sensor 100 according to a further aspect of the invention, which is suitable for use in a gas-rich environment. Sensor 100 comprises a twin-core fiber 101 with inscribed gratings 102 and a strain-resistant member 103 mounted within the interior of a frame 104.

According to an aspect of the invention, frame 104 is attached to a structure for which strain and ambient temperature are to be measured. In a practice of the invention, a change in the structure's strain state is translated into a change in the strain state of frame 104. A change in the strain state of frame 104 is then translated in turn to a change in the strain state of the inscribed gratings 102. As in the exemplary pressure and temperature sensors described above, the frame 104 may be made from multiple materials or composite materials such that temperature change does not affect the pre-strain in the gratings. The grating wavelength shifts are measured and used, together with the calibrations, to obtain the strain and temperature on the structure.

The mathematical part of this sensor is same as that in FIG. 1 case.

5. Fiber Design

As mentioned above, in a sensor according to an aspect of the invention, the sensor gratings all exhibit the same wavelength shift in response to a change in gas diffusion. A further aspect of the invention is directed to a fiber having a plurality of cores with matched wavelength shifts in response to changes in gas diffusion, and to techniques for fabricating such a fiber. It will be appreciated that the described techniques can be used in fibers containing more than two cores.

Figure 11:
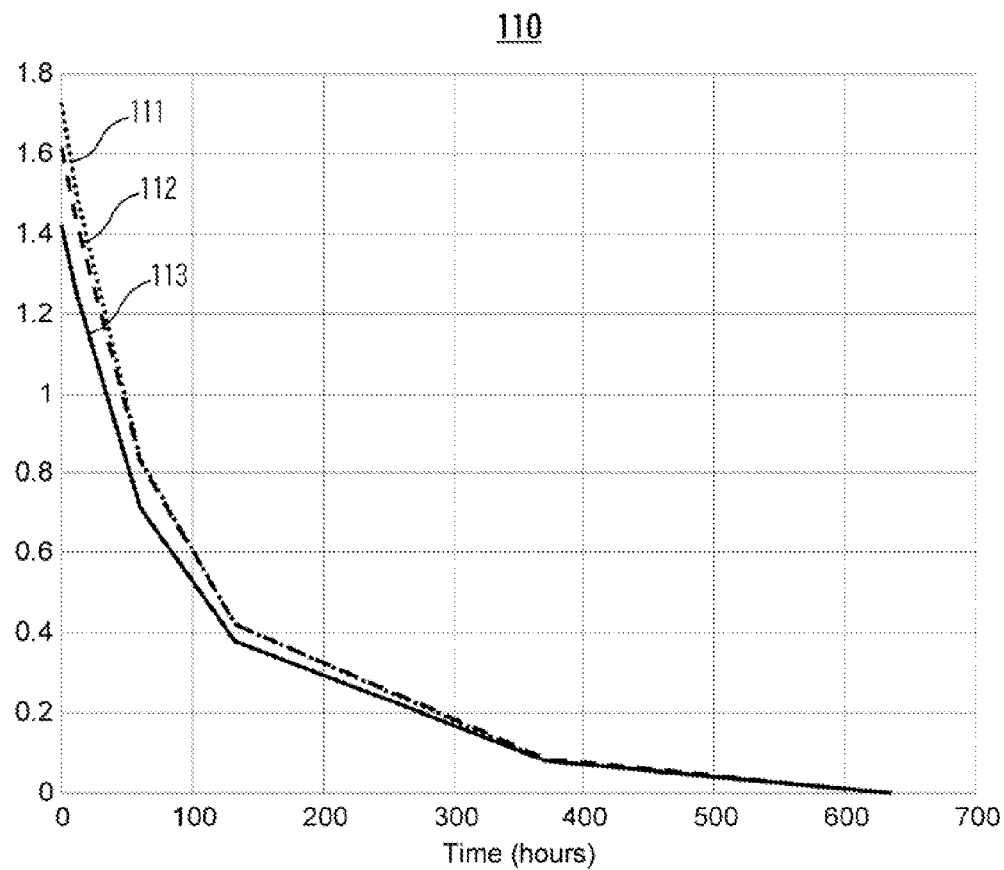
FIG. 11 shows a graph in which wavelength shifts are plotted as a function of out-diffusion time of deuterium for gratings inscribed into three different types of optical fibers.

FIG. 11 shows a graph 110 in which wavelength shifts are plotted as a function of time for gratings inscribed into three different types of optical fiber manufactured by OFS, the assignee of the present application:

(1) An OFS fiber similar to SMF28 of FIG. 1 (upper plot 111);
(2) OFS Fiber 111495 (middle plot 112); and
(3) OFS Fiber 040298 (lower plot 113).

The gas diffusion response of the gratings was measured by placing them in a high-pressure, deuterium-rich environment to allow deuterium loading to take place. The gratings were then removed from the deuterium-loading environment and left in normal air at room temperature and pressure. Wavelength measurements were then periodically conducted and plotted as a function of elapsed time.

It is noted that the described protocol employs a backwards approach, in which deuterium diffuses out of the gratings rather than into them. Such an approach allows the bulk of the testing process to be conducted at normal room temperature and pressure.

The FIG. 11 graph illustrates the gas diffusion effects that were measured using the above experimental protocol. Similar results were obtained for the gratings in a twin-core fiber, comprising a first core that was similar to that of an SMF-28-like fiber (plot 111), and a second core that was similar to that of a 111495 fiber (plot 112).

According to an aspect of the invention, gas diffusion effects for gratings having different wavelengths are matched by manipulating the choice of dopant (or dopants) and/or the concentration of a particular dopant (or dopants) that are used to create the core and cladding regions in the fiber (or fibers) into which the gratings are inscribed.

Fibers 111495 (plot 112) and 040298 (plot 113) are both highly doped with germanium at almost the same concentration. Fiber 040298 (plot 113) has some aluminum doping while Fiber 111495 (plot 112) does not. From FIG. 11, it can be seen that, compared with the SMF-28-like fiber (plot 111), both Fiber 111495 (plot 112) and Fiber 040298 (plot 113) exhibit relatively smaller wavelength shifts in response to gas diffusion. Aluminum doping further reduces wavelength shift. Thus, according to an aspect of the invention, the germanium and aluminum dopants and their concentrations can be manipulated to make two fiber gratings with the same wavelength shifts resulting from gas diffusion. The same approach can also be employed to make two fiber gratings with significantly different wavelength shifts resulting from gas diffusion.

Figure 12:
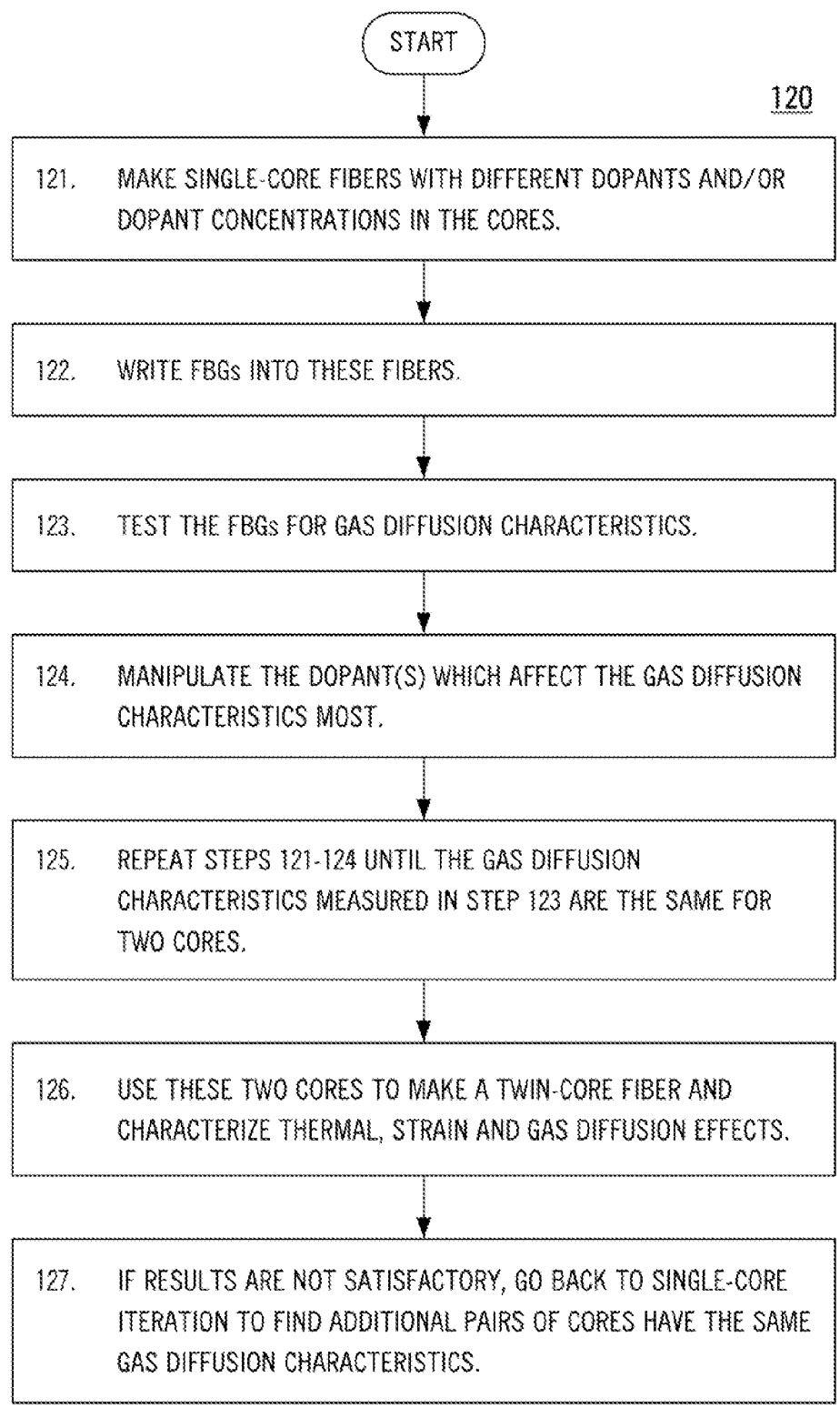
FIG. 12 shows a flowchart of a general technique according to an aspect of the invention for fabricating a fiber having a plurality of cores having the same wavelength shift for gratings inscribed therein in response to the same change in gas diffusion, but different wavelength shifts in response to changes in other parameters.

FIG. 12 shows a flowchart of a general technique 120 according to an aspect of the invention for fabricating a twin-core optical fiber, wherein both fiber cores have the same wavelength shift, within tolerance, in response to a change in gas diffusion. Technique 120 comprises the following steps:

121: Make single-core fibers with different dopants and/or dopant concentrations in the cores.
122: Write FBGs into these fibers.
123: Test the FBGs for gas diffusion characteristics.
124: Manipulate the dopant(s) which affect the gas diffusion characteristics most.
125: Repeat steps 121-124 until the gas diffusion characteristics measured in step 123 are the same for the two cores.
126: Use these two cores to make a twin-core fiber and characterize thermal, strain and gas diffusion effects.
127: If results are not satisfactory, go back to single-core iteration to find additional pairs of cores have the same gas diffusion characteristics.

CONCLUSION

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

What is claimed is:

1. An optical fiber sensor for use in an environment rich in a selected gas, comprising:
   an enclosure;
   an optical fiber having a lead end that is mounted within the enclosure, so as to extend across the enclosure interior; and
   a sensor array, comprising a plurality of gratings written into the lead end of a twin-core optical fiber, wherein the gratings are configured to receive a light input and to provide respective individual outputs having wavelengths that vary in response to respective changes in temperature, gas diffusion, and strain,
   wherein changes in temperature, strain, and gas diffusion are derivable from the respective individual outputs of the gratings in sensor array, and
   wherein each of the plurality of gratings is configured to have equal wavelength shifts in response to gas diffusion within the fiber segment, such that gas diffusion parameters are excludable when deriving changes in temperature, strain, and gas diffusion,
   whereby measurements are obtainable at varying levels of gas diffusion.

2. The sensor of claim 1, wherein the selected gas comprises hydrogen.

3. The sensor of claim 1, wherein the selected gas comprises deuterium.

4. The sensor of claim 1,
   wherein the twin-core optical fiber comprises first and second cores, wherein the first and second cores are configured to have different respective refractive indices, and
   wherein the gratings are formed by inscribing sets of periodic perturbations across both fiber cores, whereby each set of periodic perturbations results in a pair of gratings having a same grating period, but different wavelengths.

5. The sensor of claim 4,
   wherein the plurality of gratings includes first and second paired gratings at a first location, and a third sensor grating at a second location.

6. The sensor of claim 4,
   further comprising a connector fiber for providing a light input into the twin-core fiber segment, and for receiving therefrom an output comprising light reflected back from the sensor array.

7. The sensor of claim 6,
wherein the connector fiber comprises a transmission fiber having a single core that is coupled to one of the cores of the twin-core fiber segment, and
wherein a lead end of the twin-core fiber segment comprises a tapered region in which the first and second cores of the twin-core fiber segment are optically coupled to each other,
whereby input light from the transmission fiber is fed into both the first and second cores of the twin-core fiber segment, and
whereby output light from the first and second cores of the twin-core fiber is fed into the single core of the transmission fiber.

8. The sensor of claim 4,
wherein the twin-core fiber segment has a dopant profile that is configured such that each of the plurality of gratings has the same wavelength shift over time in response to a change in gas diffusion.

9. The sensor of claim 8,
wherein first and second cores of the twin-core fiber segment are doped according to respective first and second dopant profiles, such that the first and second cores have different wavelengths with precisely matched wavelength shifts over time in response to a change in gas diffusion.

10. The sensor of claim 9, wherein at least one of the first and second dopant profiles includes germanium.

11. The sensor of claim 9, wherein at least one of the first and second dopant profiles includes aluminum.

12. The sensor of claim 9, wherein at least one of the first and second dopant profiles includes a combination of germanium and aluminum.

13. The optical fiber sensor of claim 1, wherein the lead end of the fiber segment is mounted within the enclosure such that a selected amount of pre-strain is applied to the fiber segment along its longitudinal axis.

14. The optical fiber sensor of claim 13, wherein at least one grating in the sensor array is located in a strain-resistant section of the fiber segment, such that a change in strain applied across the sensor gratings results in a proportionately smaller change in strain at the at least one grating compared with the change in strain at the other gratings.

15. The optical fiber sensor of claim 14, wherein the strain-resistant section of the fiber segment comprises a porous glass tube mounted to the exterior of the fiber segment.

16. The optical fiber sensor of claim 1, further including:
translation means for translating changes in ambient pressure into changes in strain applied to the sensor gratings.

17. The optical fiber sensor of claim 16,
wherein the translation means comprises a resiliently displaceable diaphragm mounted at the exterior of the enclosure, wherein the diaphragm is configured such that a change in ambient pressure causes a displacement of the diaphragm, and
wherein the diaphragm is mechanically coupled to the lead end of the fiber segment, such that a displacement of the diaphragm is translated into a change in applied strain across the sensor gratings.

18. The optical fiber sensor of claim 1,
wherein the lead end of the fiber segment includes a bulge in the fiber cladding surrounding a sensor grating, and tapered transitions between the bulge and non-bulged portions of the fiber,
wherein the lead end of the fiber segment is sealed into the enclosure between supporting end pieces shaped to closely receive respective ends of the bulge, so as to apply a longitudinal pre-compression strain across the grating surrounded by the bulge,
such that the grating surrounded by the bulge experiences changes in strain not experienced by other sensor gratings.

19. The optical fiber sensor of claim 18, further comprising:
a cylindrical tube surrounding into which the supporting end pieces fit, and
an end plate and a base plate attached respectively to the supporting end pieces,
wherein the fiber segment, the supporting end pieces, the cylindrical tube, and the end plate and base plate are configured to be sealed together to form an airtight enclosure.

20. The optical fiber sensor of claim 19, wherein all of the sensor components are fabricated from quartz or glass.

21. The optical fiber sensor of claim 1,
wherein the fiber segment is mounted within a frame with a selected amount of pre-strain applied across one or more sensor gratings,
wherein the frame configured to be attachable to a structure for which strain and ambient temperature are to be measured,
wherein the frame is configured such that a change in the strain state of the structure is translated into a change in the strain state of the frame, and
wherein the change in the strain state of the frame is translated into a change in the strain state of the inscribed gratings.

22. The optical fiber sensor of claim 21, wherein the frame is configured such that that temperature change does not affect pre-strain across the gratings.

23. An optical fiber, comprising:
first and second core regions extending through a common cladding region,
wherein the first and second core regions have a dopant profile that is configured such that the first and second core regions have different refractive indices,
wherein the first and second core regions have first and second gratings respectively inscribed into them at a given location along the length of the optical fiber, such that the first and second gratings have the same wavelength shift over time in response to a change in gas diffusion.

24. The fiber of claim 23,
wherein the dopant profile of the fiber includes first and second dopants having different effects on the wavelength shift over time of the first and second gratings in response to a change in gas diffusion,
whereby precise matching of the wavelength shift is achievable by adjusting the relative concentrations of the first and second dopants.

25. The sensor of claim 24, wherein one of the first and second dopants is germanium.

26. The sensor of claim 24, wherein one of the first and second dopants is aluminum.

27. The sensor of claim 24, wherein one or both cores of the optical fiber has a dopant profile comprising a selected combination of germanium and aluminum.

28. A method for conducting optical fiber-based sensing in an environment rich in a selected gas, comprising the steps of:

A. providing a plurality of sensor gratings inscribed into the one or more segments of optical fiber, each sensor grating having a respective wavelength that shifts in response to a change in temperature, a change in a strain applied across the sensor grating, and a change in the diffusion of a selected gas throughout the sensor grating, wherein each of the plurality of sensor gratings is configured to have the same wavelength shift over time in response to a change in gas diffusion;

B. feeding an input light into the plurality of sensor gratings; and

C. using wavelength shift data reflected back from the plurality of sensor gratings to determine single, unique values for the respective amount of change in one or more physical quantity from a group of physical quantities including temperature, applied strain, and gas diffusion, wherein gas diffusion parameters are excluded in step C.

29. A method of determining pressure or temperature in an environment rich in a selected gas, the method comprising:

A. providing a set of three fiber Bragg grating (FBG) elements capable of receiving an optical signal and reflecting light in response to the optical signal, light reflected from each respective FBG element having a wavelength dependent on parameters of the respective FBG element, the determination of pressure or temperature in the environment rich in the selected gas being obtained in relation to the wavelengths of light reflected by the FBG elements in response to the optical signal;

the first and second FBG elements forming a first pair of FBG elements and the third FBG element being distinct from the first pair of FBG elements, wherein the three FBG elements, respectively, have (i) different temperature coefficients but (ii) the same wavelength shift in the presence of diffusion of the selected gas into the respective FBG elements, and wherein strain coefficients of the three FBGs need not be the same, and wherein the FBG elements in the sensor, in use, are exposed to an applied temperature and an applied pressure in the environment rich in the selected gas;

B. providing a mechanism for coupling the applied pressure into the FBG elements in the form of a respective strain component in each respective FBG element;

C. providing a mechanism for mechanically reinforcing the third FBG element, such that while strain due to the applied pressure will be different as between the third FBG element and the first pair of FBG elements, both the third FBG element and the first pair of FBG elements will be exposed to the same gaseous and temperature conditions in the environment rich in the selected gas; and D. determining the applied pressure or the applied temperature based on detected wavelengths of light reflected from the first pair of FBG elements and the third FBG element, respectively, and without requiring that the strain coefficients of the three FBG elements be the same.

30. A method for fabricating an optical fiber, comprising:

providing a plurality of cores extending through a common cladding, doping a plurality of the cores so to define, in conjunction with the cladding, a plurality of waveguides having different wavelengths and further having precisely matched wavelength shifts over time in response to changes in gas diffusion, wherein the dopant profiles of the plurality of cores include first and second dopants having different effects on wavelength shift over time in response to changes in gas diffusion, and wherein precise matching of the wavelength shifts over time in response to changes in gas diffusion is achieved by adjusting the relative concentrations of the first and second dopants.

31. A method for making a twin-core optical fiber, wherein both fiber cores have the same wavelength shift, within tolerance, in response to a change in gas diffusion, comprising the steps of:

A. making single-core fibers with different dopants and/or dopant concentrations in the cores;

B. writing gratings into the single-core fibers;

C. testing the gratings for gas diffusion characteristics;

D. manipulating the respective dopant profiles of the single-core fibers with respect to one or more dopants affecting gas diffusion characteristics most;

E. repeating steps A-D until the gas diffusion characteristics measured in step C are the same for two cores; and F. using the two cores to make a twin-core fiber and characterize thermal, strain and gas diffusion effects.

32. The method of claim 21, further comprising the step of going back to single-core iteration to find additional pairs of cores have the same gas diffusion characteristics, if the results from steps A-F are not satisfactory.

* * * * *